United States Patent [19]

Schultes

[11] Patent Number: 4,872,436

[45] Date of Patent: Oct. 10, 1989

[54] ARRANGEMENT FOR STABILIZING THE IDLING SPEED OF AN INTERNAL COMBUSTION ENGINE

[75] Inventor: Helmut Schultes, Gruenthal, Fed. Rep. of Germany

[73] Assignee: Siemens Aktiengesellschaft, Berlin and Munich, Fed. Rep. of Germany

[21] Appl. No.: 247,408

[22] Filed: Sep. 21, 1988

[30] Foreign Application Priority Data

Dec. 16, 1987 [DE] Fed. Rep. of Germany ....... 3742668

[51] Int. Cl.$^4$ .............................................. F02D 41/16
[52] U.S. Cl. .................................... 123/339; 123/416
[58] Field of Search ............... 123/339, 416, 417, 418, 123/350; 364/431.07

[56] References Cited

U.S. PATENT DOCUMENTS

| | | |
|---|---|---|
| 4,445,477 | 5/1984 | Ikeura .................................. 123/416 |
| 4,552,109 | 11/1985 | Boccadoro et al. ................. 123/339 |
| 4,658,787 | 4/1987 | Takizawa ............................. 123/339 |
| 4,672,934 | 6/1987 | Peter et al. .......................... 123/339 |
| 4,696,272 | 9/1987 | Kato et al. .......................... 123/339 |
| 4,785,780 | 11/1988 | Kawai .................................. 123/339 |
| 4,815,433 | 3/1989 | Wild ..................................... 123/339 |

FOREIGN PATENT DOCUMENTS

| | | | |
|---|---|---|---|
| 0123002 | 10/1984 | European Pat. Off. ............ | 123/339 |
| 3008232A1 | 9/1981 | Fed. Rep. of Germany ...... | 123/339 |
| 2454526 | 11/1980 | France ................................. | 123/339 |
| 61-201883 | 9/1986 | Japan .................................. | 123/339 |

Primary Examiner—Raymond A. Nelli
Attorney, Agent, or Firm—Hill, Van Santen, Steadman & Simpson

[57] ABSTRACT

Arrangement for stabilizing the idling speed of an internal combustion engine. In an arrangement for early setting of the ignition angle having a microcomputer, a timer is provided that is set to a run-down time (t) that is a rated time that the crankshaft needs in order to turn from an arbitrarily selected basic angle (GW) to an associated idling angle (LW) for a rated idling speed, this idling angle being the ignition angle at the rated idling speed. The timer is started when the angular position of the crankshaft has reached the basic angle (GW). The angular position of the crankshaft following the run-down time (t) is a premature angle (FW) that is used as the ignition angle and that occurs earlier and earlier for dropping idling speed. The arrangement guarantees an immediate early setting of the ignition angle for decreasing idling speed without direct involvement of the microcomputer.

7 Claims, 1 Drawing Sheet

ARRANGEMENT FOR STABILIZING THE IDLING SPEED OF AN INTERNAL COMBUSTION ENGINE

BACKGROUND OF THE INVENTION

The present invention is directed to an arrangement for stabilizing the idling speed of an internal combustion engine by early adjustment of an ignition angle. The arrangement is of the type which has a rotating encoder device, such as a distributor, that supplies encoder signals proportional to the speed of the internal combustion engine, a motor control device that contains a microcomputer to which the encoder signals are supplied and that provides a premature angle therefrom as the ignition angle for a defined idling speed of the internal combustion engine.

Such an early adjustment of the ignition angle is disclosed, for example, by German Published Application 30 08 232. As disclosed, a microcomputer calculates the ignition angle as a function of parameters such as the RPM of the internal combustion engine.

Calculating speed is a problem for microcomputers in motor control devices which calculate the blocking period for every cylinder of an internal combustion engine. The time available to the microcomputer between two ignitions in order to calculate the optimum ignition angle becomes less for higher speed of the internal combustion engine, for more cylinders and for more functions of the engine and the more functions the motor control must satisfy. This problem is present whether or not the microcomputer calculates the ignition angle before every ignition or derives it from performance characteristics.

In order to chronologically reduce the demands on the microcomputer, the calculation of the ignition angle can be done, for example, for only every 4th ignition instead of for every individual ignition. The ignitions between two calculations then all have the same ignition angle that may not be optimum under certain conditions. This procedure is therefore less suitable in operating ranges of the internal combustion engine that require an extremely fast adaptation of the ignition angle. During a fast reduction of the RPM when the internal combustion engine is idling, for example, this reduction caused by a sudden increase in load, an early adjustment of the ignition angle is necessary at the next following ignition in order to prevent the engine from stalling.

In this case, there is only the possibility of either using a correspondingly fast and, thus, expensive microcomputer or of accepting a less optimum idling stabilization.

SUMMARY OF THE INVENTION

An object of the present invention is to provide an arrangement for stabilization of the idling speed with a microcomputer such that a simple, standard microcomputer is adequate. Nonetheless, an early adjustment of the ignition angle should be effected at the next following ignition for every fast reduction of the RPM.

The arrangement has in a motor control device an adjustable timer whose run-down time (t) is set to a rated time that a reference point (BZ) on a crankshaft of the engine requires for a defined rated idling speed in order to turn from a basic angle (GW) to a defined idling angle (LW) that is the ignition angle at the rated idling speed. A timer begins to run down when the reference point (BZ) has reached the basic angle (GW).

The motor control device contains a logic circuit that, during idling of the internal combustion engine, uses a premature angle (FW), which is the angular position of the reference point (BZ) after the run-down time (t), as the ignition angle when this premature angle (FW) is chronologically reached before the idling angle (LW) and otherwise uses the idling angle (LW) as the ignition angle.

Each of the following angular data (see FIGS. 1 and 2) references a specific angular position of a reference point BZ on a crankshaft, for example the fastening point of a connecting rod, with respect to a stationary reference point OT, whereby the reference point BZ has the angular position 0° when the piston reaches its OT-position (upper slack). The angular data are counted in degrees from the reference point opposite the rotational direction of the crankshaft shown in FIG. 1.

The basic idea of the present invention is based on the reference point BZ of the crankshaft requiring a rated time for an established, rated idling speed in order to rotate from an arbitrarily selected, permanently described basic angle GW up to an idling angle LW defined for this rated idling speed, this idling angle OW being the ignition angle at the rated idling speed. The rated time period, accordingly, begins when the reference point passes the basic angle GW. When the speed drops in comparison to the rated idling speed, then the reference point BZ will no longer reach the idling angle LW after the lapse of the rated time period but will only assume a premature angle FW between the basic angle GW and the idling angle OW. With decreasing speed, this premature angle FW lies farther and farther from the idling angle LW in the direction toward the basic angle GW. When ignition is always carried out after the expiration of the rated time period, i.e. with he premature angle FW as an ignition angle, then an ignition angle that always lies earlier and earlier and opposes the speed reduction results for a speed decreasing in comparison to the rated idling speed.

An adjustable timer whose run-down time is this rated time period, is inventively provided for this function. The difference between the idling angle and the basic angle is identified from tests and is selected such that an optimum dynamics of the premature angle FW results for the motor. The run-down time of the timer and the basic angle GW are calculated by a microcomputer that also has the rated idling speed and the associated idling angle stored in a performance characteristic memory.

If the speed were to rise in comparison to the rated idling speed, then the above-described arrangement would undesirably shift the ignition angled toward "retard". A logic circuit is therefore provided to which the idling angle LW and the premature angle FW generated by the arrangement are supplied, this logic circuit allowing the chronologically earlier of the two to take effect as the ignition angle. No ignition angle lying chronologically after the idling angle LW is therefore possible during idling.

In the present invention, the run-down time need be calculated only once for a rated idling speed and the associated idling angle LW. In all following ignitions, an early setting of the ignition angle then automatically results for a potential fast reduction in speed. In an advantageous development of the invention, the microcomputer nonetheless calculates a new idling angle LW from time to time for the present speed, calculating this from the performance characteristics, and also calculating a corresponding, new run-down time and a new basic angle GW. The early adjustment of the ignition angle prescribed by the arrangement is therefore repeatedly normed by an idling angle LW acquired from the performance characteristics. How often, i.e. after how many ignitions, this recalculation is carried out depends on the design of the internal combustion engine as well as on the capabilities of the microcomputer. In any case, the microcomputer has a great deal of time for every recalculation since it has to perform this calculation only at every $x^{th}$ ignition. Despite this, the above-described arrangement provides an immediate possibility of early adjustment of the ignition angle from ignition to ignition.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several figures of which like reference numerals identify like elements, and in which:

DESCRIPTION OF THE PREFERRED EMBODIMENT

Figure 1:
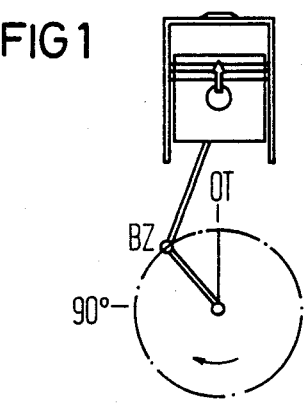
FIG. 1 is a depiction of a crankshaft and piston in an internal combustion engine.
Figure 2:
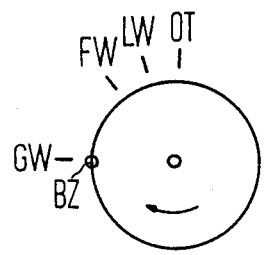
FIG. 2 is a diagram illustrating the ignition angle for the internal combustion engine.
Figure 3:
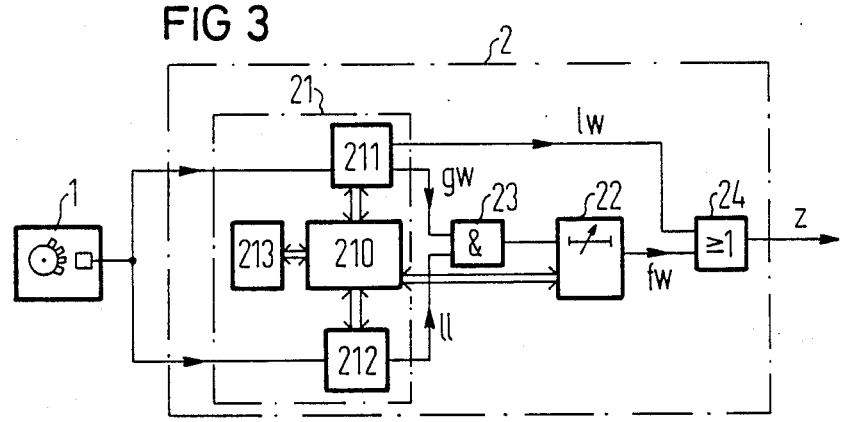
FIG. 3 is a block circuit diagram of an arrangement of the present invention.

FIG. 3 shows an encoder device 1 that has a rotating part and a stationary part. The rotating part is connected to the crankshaft of an internal combustion engine and carries markings that the stationary part senses. The encoder device 1 generates encoder signals that contain information about the speed of the crankshaft and, thus, of the internal combustion engine and about the angular position of a reference point BZ on the crankshaft. Such an encoder arrangement 1 is disclosed, for example, in U.S. Pat. No. 4,121,112 (Hartig).

The encoder signals are supplied to a motor control means 2 that derives an ignition signal z therefrom, this ignition signal z driving a final ignition stage that is not shown in FIG. 3. As critical components for the ignition functions, the motor control device 2 contains a microcomputer 21, an adjustable timer 22 as well as a logic circuit composed of an AND element 23 and of an OR element 24.

The microcomputer 21 is only partially illustrated with a few function blocks which are important to the present invention. A central unit 210 is connected to an angle unit 211 and to an RPM unit 212 as well as to a performance characteristic memory 213.

The angle unit 211 uses the encoder signals from the encoder device 1 to calculate the respective angular position of the reference point BZ. It continuously compares this angular position to the values prescribed by the central unit 220 for a basic angle GW and for an idling angle LW. When the angling position of the reference point BZ corresponds to these values, the angle unit 211 generates a basic angle signal gw at an output and an idling angle signal lw at a different output.

The RPM unit 212 uses the encoder signals from the encoder arrangement 1 to calculate the speed of the crankshaft which is sent to the central unit 210. It also compares this speed to a speed range from 500 through 100 RPM. When the speed is in this speed range, then the RPM unit 212 outputs an idling signal 11 at an output.

The values of the idling angle LW for the speeds of the internal combustion engine during idling are stored in the performance characteristic memory 213.

Let it be assumed that the internal combustion engine is idling and has reached a defined rated idling speed. The central unit 210 receives the value for this rated idling speed from the RPM unit and then retrieves the associated idling angle GW from the performance characteristics memory 213. The basic angle GW is then this idling angle LW plus a constant value K. This constant value K is empirically determined and varies in different internal combustion engines and is used in the following formula:

$$GW = LW + K \qquad (1)$$

The central unit 210 now calculates a rated time ts that is used to move the reference point BZ from the basic angle GW up to the idling angle LW for the rated idling speed. The applicable formula is:

$$ts = \frac{1}{n} \times K. \qquad (2)$$

wherein
n = speed of the crankshaft; and
ts = rated time.

The central unit 210 is connected to an adjustable timer 22 via an interactive connection. It sets the rundown time of this timer 22 to the above-calculated rated time ts. The timer 22 is initiated by an AND element 23 when the AND condition is met at the inputs thereof, one input receiving the basic angle signal gw and the other input receiving the idling signal 11. In this case the internal combustion engine is idling and the reference point BZ has reached the basic angle GW. The timer 22 now runs down and generates a premature angle signal fw at its output after its run-down time t, this premature angle signal fw becoming the ignition signal z via the OR element 24. The OR element 24 receives the signal fw on a first input.

On a second input, the OR element 24 receives the idling angle signal lw from the angle unit 211. The signal, either the idling angle signal lw or the premature angle signal fw, that occurs first at the OR element 24 becomes the ignition signal z. In the following final ignition stage, only this first signal is processed and the signal which arrives later does not take effect.

Figure 4:
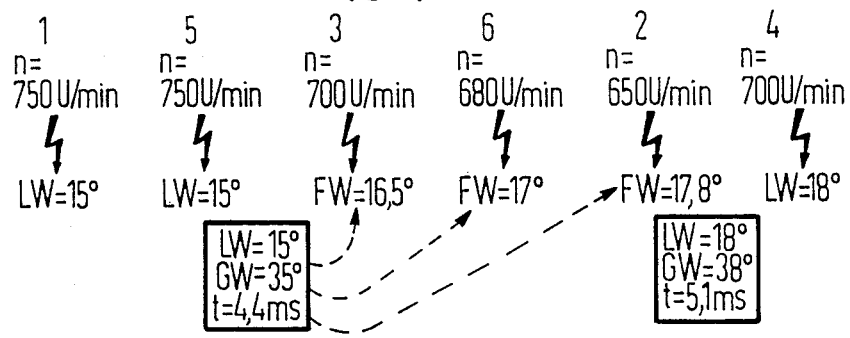
FIG. 4 is a schematic firing sequence diagram with reference to the example of a six-cylinder engine.

The functioning of an engine shall be set forth with reference to a schematic firing sequence diagram according to FIG. 4. A 6-cylinder in-line motor is assumed, having a firing sequence 1, 5, 3, 6, 2, 4 as set forth in the uppermost line in FIG. 4. An example of a speed curve is shown in the line therebelow. It is assumed in all six firings that the internal combustion engine is idling.

At the firing of cylinder 1, a rated idling speed of 750 rpm and an associated idling angle LW of 15° are present. These relationships still remain unchanged at the firing of the next cylinder 5. A recalculation by the microcomputer 21 then follows:

An idling angle LW of 15° results from the performance characteristics memory 213 for the rated idling speed of 750 rpm;

the basic angle GW is then the idling angle LW plus the constant value K of 20°, i.e. 35°;

the run-down time t derives from equation (2), and is 4.4 ms.

At the firing of cylinder 3, the speed has fallen to 700 rpm. The timer 22 has already run-down before the idling angle LW is reached. The premature angle signal fw thus lies chronologically before the idling angle signal lw and produces the ignition signal z. This premature angle FW occurs after the one-time calculation of the run-down time t of the timer 22 without further involvement of the microcomputer 21. Only the timer 22 and the logic circuit composed of the AND element 23 and the OR element 24 provide this early setting. The size of this premature angle FW set by the arrangement can be given by a calculation.

The premature angle FW must be equal to the basic angle GW minus the angular range by which the reference point BZ continues to move with the new speed during the run-down time t, i.e., $FW = GW - t \times ne = 16.5$; where ne = new speed.

At the firing of the cylinder 6 and a speed that has fallen to 680 rpm, a premature angle FW of 17° correspondingly derives. Finally, at the following cylinder 2 and 650 rpm the premature angle FW is 17.8°.

This firing is followed by a recalculation carried out by the microcomputer 21. An idling angle LW of 18° derives with a speed of 650 rpm and a basic angle GW of 38° and a run-down time t of 5.1 ms is calculated therefrom. One can also see the correct dimensioning of K with reference to this example since the transition from the premature angle FW of 17.8° generated most recently by the arrangement to the new idling angle LW of 18° is provided steadily from the performance characteristics memory 213, i.e., without discontinuous modification of the angular value.

The purpose of this recalculation is that the premature angle FW produced by the arrangement is formed over and over on the basis of new idling angles LW from the performance characteristics memory 213. This occurs because the values in the performance characteristics memory 213 are optimally designed for the requirements of the internal combustion engine. The speed of the read-out event thereby does not play a significant part since fast changes of ignition angle that are required are carried out by the arrangement in the manner set forth.

At the firing of cylinder 4, the speed has risen again to 700 rpm. The timer 22, accordingly, does not run down until after the idling angle LW and, accordingly, the ignition occurs when this idling angle LW is reached.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not a limiting sense.

What is claimed is:

1. An arrangement for stabilizing the idling speed of an internal combustion engine by early adjustment of an ignition angle, the arrangement having a rotating encoder device that supplies encoder signals proportional to the speed of the internal combustion engine, and having a motor control device that contains a microcomputer to which the encoder signals are supplied and that provided a premature angle therefrom as the ignition angle for a defined idling speed of the internal combustion engine, comprising:

the motor control device having an adjustable timer, whose run-down time (t) is set to a rated time that a reference point (BZ) on a crankshaft of the engine requires for a defined rated idling speed in order to turn from a basic angle (GW) to a defined idling angle (LW) that is the ignition angle at the rated idling speed;

the timer beginning to run down when the reference point (BZ) has reached the basic angle (GW); and the motor control device containing a logic circuit that, during idling of the internal combustion engine, uses a premature angle (FW), which is the angular position of the reference point (BZ) after the run-down time (t), as the ignition angle when this premature angle (FW) is chronologically reached before the idling angle (LW) and otherwise using the idling angle (LW) as the ignition angle.

2. The arrangement according to claim 1, wherein the run-down time (t) is a product of a inversed speed of the engine and a difference between the idling angle (LW) and the basic angle (GW).

3. The arrangement according to claim 2, wherein the run-down time (t) and the basic angle (GW) are respectively recalculated after x ignitions on the basis of a new idling speed and of an associated, new idling angle (LW).

4. The arrangement according to claim 1, wherein the logic circuit contains an AND element and an OR element.

5. An arrangement for stabilizing the idling speed of an internal combustion engine by early adjustment of the ignition angle, the arrangement having a rotating encoder device that supplies encoder signals proportional to the speed of the internal combustion engine, and having a motor control device that contains a microcomputer which receives the encoder signals and which outputs a premature angle (FW) as the ignition angle for a defined idling speed of the internal combustion engine, the motor control device containing an adjustable timer having a run-down time (t) is set to a rated time that a reference point (BZ) on a crankshaft of the engine requires for a defined rated idling speed in order to turn the reference point (BZ) from a basic angle (GW) on the crankshaft to a defined idling angle (LW) on the crankshaft that is the ignition angle at the rated idling speed;

the timer beginning to run down when the reference point (BZ) has reached the basic angle (GW); and the motor control device containing a logic circuit that, during idling of the internal combustion engine, uses a premature angle (FW), which is the angular position of the reference point (BZ) after the run-down time (t), as the ignition angle when this premature angle (FW) is chronologically reached before the idling angle (LW) and otherwise uses the idling angle (LW) as the ignition angle, the logic circuit having an AND element with one input receiving an idling signal from the microcomputer and another input receiving the basic angle (FW) from the microcomputer and with an output connected to an input of the timer, the logic circuit also having an OR element with one input receiving the premature angle (FW) from the timer and another input receiving the defined idling angle (LW) from the microcomputer, an output of the OR element providing an ignition signal (Z).

6. The arrangement according to claim 5, wherein the run-down time (t) is a product of a new speed of the engine and a difference between the idling angle (LW) and the basic angle 7. The arrangement according to claim 5, wherein the run-down time (t) and the basic angle (GW) are respectively recalculated after x ignitions on the basis of an inversed idling speed and of an associated, new idling angle (LW).

* * * * *